United States Patent
Wybenga et al.

(10) Patent No.: US 7,672,304 B2
(45) Date of Patent: Mar. 2, 2010

(54) METHOD AND SYSTEM FOR SWITCHING FRAMES IN A SWITCHING SYSTEM

(75) Inventors: Jack C. Wybenga, Plano, TX (US);
Patricia K. Sturm, Marion, IA (US);
Yingwei Wang, Dallas, TX (US);
Pradeep Samudra, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1294 days.

(21) Appl. No.: 11/155,003

(22) Filed: Jun. 16, 2005
(Under 37 CFR 1.47)

(65) Prior Publication Data
US 2007/0002849 A1    Jan. 4, 2007

(51) Int. Cl.
*H04L 12/28* (2006.01)
(52) U.S. Cl. .................. 370/389; 370/412; 370/395.31; 370/386
(58) Field of Classification Search .................. 370/232, 370/236, 389, 395, 401, 412
See application file for complete search history.

(56) References Cited

U.S. PATENT DOCUMENTS

| | | | | |
|---|---|---|---|---|
| 4,729,095 A * | 3/1988 | Colley et al. | ................. | 712/203 |
| 5,546,385 A * | 8/1996 | Caspi et al. | .................. | 370/412 |
| 5,905,725 A * | 5/1999 | Sindhu et al. | ................ | 370/389 |
| 5,978,023 A * | 11/1999 | Glenn | ........................ | 348/234 |
| 6,144,640 A * | 11/2000 | Simpson et al. | ............. | 370/236 |
| 6,614,756 B1 * | 9/2003 | Morgenstern et al. | ....... | 370/230 |
| 6,636,518 B1 * | 10/2003 | Liencres | .................. | 370/395.7 |
| 6,721,271 B1 * | 4/2004 | Beshai et al. | ................ | 370/232 |
| 6,751,225 B1 * | 6/2004 | Chung | ........................ | 370/401 |
| 6,816,490 B1 * | 11/2004 | Chung | ........................ | 370/392 |
| 6,885,670 B1 * | 4/2005 | Regula | ........................ | 370/401 |
| 7,046,660 B2 * | 5/2006 | Wallner et al. | .............. | 370/386 |
| 7,068,653 B2 * | 6/2006 | Lespagnol | ................. | 370/390 |
| 7,116,660 B2 * | 10/2006 | Sindhu et al. | ................ | 370/389 |
| 7,139,277 B2 * | 11/2006 | Ofek et al. | .................. | 370/401 |
| 7,170,906 B2 * | 1/2007 | Ofek et al. | .................. | 370/498 |
| 7,352,766 B2 * | 4/2008 | Van Asten et al. | ........... | 370/429 |
| 7,356,030 B2 * | 4/2008 | Chang et al. | ................. | 370/392 |
| 7,382,787 B1 * | 6/2008 | Barnes et al. | ................ | 370/401 |
| 7,596,139 B2 * | 9/2009 | Patel et al. | .................. | 370/392 |

* cited by examiner

*Primary Examiner*—William Trost, IV
*Assistant Examiner*—Emmanuel Maglo (57) ABSTRACT

A method for switching frames in a switching system is provided. The method includes receiving a first stripe set for a first port at a second port. The first stripe set is stored in a particular location in a queue of the second port. A determination is made regarding whether a first full flag associated with the first port has been set. If the first full flag has not been set, the first full flag is set and the particular location in the queue of the second port is provided to the first port.

20 Claims, 5 Drawing Sheets

METHOD AND SYSTEM FOR SWITCHING FRAMES IN A SWITCHING SYSTEM

CROSS-REFERENCE TO RELATED APPLICATION

The present invention is related to that disclosed in U.S. patent application Ser. No. 11/150,814, filed concurrently herewith, entitled "Method and System for Processing Frames in a Switching System." U.S. patent application Ser. No. 11/150,814 is assigned to the assignee of the present application. The subject matter disclosed in U.S. patent application Ser. No. 11/150,814 is hereby incorporated by reference into the present disclosure as if fully set forth herein.

TECHNICAL FIELD OF THE INVENTION

The present invention relates generally to wireless networks and, more specifically, to a method and system for switching frames in a switching system.

BACKGROUND OF THE INVENTION

Ethernet can operate in two basic modes: 1) Carrier Sense Multiple Access with Collision Detection (CSMA/CD), known as Half Duplex or Shared Ethernet, and 2) Point-to-Point, known as Full Duplex or Switched Ethernet. As the data rates increase, either the network diameter decreases or the slot time must increase because of the round-trip delay constraint imposed by CSMA/CD. The round-trip delay constraint for collision detection provides that the time to transmit a packet must be greater than the round trip time for a signal to travel between the two farthest stations; i.e., it must send at least twice the total cable length in bits for any transmission.

For currently implemented 1-Gigabit Ethernet (GbE), the slot time had to be increased to 512 bit times to give a reasonable network diameter of 300 meters. This large slot time leads to high overhead for small packets, so the throughput decreased. Packet bursting was used to improve this throughput.

For 10 GbE and higher these trade-offs between slot time and network diameter become more unpalatable, so shared (half duplex) Ethernet is not an extremely attractive option. Full duplex Ethernet does not suffer from this restriction in round-trip delay time. Current networks have been converting to switched (full duplex) Ethernet as switching technologies have become more cost effective to provide higher performance. Thus, the need for half duplex operation is becoming a smaller factor. For the higher speed Ethernets, such as 10 GbE and beyond, half duplex operation is non-existent.

There is a desire to use Ethernet technology to displace ATM, Frame Relay, and SONET in the core network, providing end-to-end Ethernet connectivity. The advantages of end-to-end Ethernet connectivity include (i) fewer technologies to support; (ii) simpler, cheaper technology due to eliminating the complex, expensive SONET connections; (iii) elimination of expensive protocol conversions that get more difficult as the data rates increase; (iv) improved support for Quality of Service (QoS) because protocol conversions can lead to a loss of the priority fields; and (v) improved security because security features may not be retained through the protocol conversions.

Newer applications are driving the data rates of the core network, as well as the local networks, continually higher. Currently, 1 GbE is readily available and 10 GbE is becoming more common. The Galaxy-V6 system provides 1 GbE network interfaces and uses 10 GbE HiGig inter-connections between the routing nodes and the switch modules. Still, the demand for even higher data rates has continued. Applications driving these increased data rates include (i) grid computing; (ii) large server systems; (iii) high performance building backbones; and (iv) high capacity, long lines. However, current switching systems have been unable to provide switching of frames at data rates much higher than 10 Gigabits/second.

Therefore, there is a need in the art for an improved switching system that is capable of switching frames at data rates higher than 10 Gigabits/second. In particular, there is a need for a switching system that is able to switch Ethernet frames at data rates of up to 100 Gigabits/second and higher.

SUMMARY OF THE INVENTION

In accordance with the present invention, a method and system for switching frames in a switching system are provided that substantially eliminate or reduce disadvantages and problems associated with conventional methods and systems.

To address the above-discussed deficiencies of the prior art, it is a primary object of the present invention to provide a method for switching frames in a switching system. According to an advantageous embodiment of the present invention, the method comprises receiving a first stripe set for a first port at a second port. The first stripe set is stored in a particular location in a queue of the second port. A determination is made regarding whether a first full flag associated with the first port has been set. If the first full flag has not been set, the first full flag is set and the particular location in the queue of the second port is provided to the first port.

According to one embodiment of the present invention, a determination is made regarding whether a second full flag associated with the second port has been set. If the second full flag has been set, a queue pointer operable to identify a location of a second stripe set is retrieved and the second stripe set is retrieved based on the queue pointer.

According to another embodiment of the present invention, the second stripe set is sent to an external port corresponding to the second port.

According to still another embodiment of the present invention, a determination is made regarding whether a second full flag associated with a third port has been set previously by the second port. If the second full flag has been set previously by the second port, the second full flag is cleared after a specified action is accomplished.

According to yet another embodiment of the present invention, the specified action comprises a full rotation of a drum that is operable to be accessed by the second port and the third port and that is operable to store the second full flag.

According to a further embodiment of the present invention, the first stripe set comprises a plurality of lower data rate (LDR) stripes having a low data rate. The LDR stripes are generated by a data striping technique performed on an incoming high data rate (HDR) data stream having a higher data rate than the low data rate. Each of the plurality of LDR stripes is processed using processing techniques associated with the low data rate.

According to a still further embodiment of the present invention, the higher data rate comprises 100 Gbps, the low data rate comprises 10 Gbps, and the plurality of LDR stripes comprises twelve LDR stripes.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged switching system.

Figure 1:
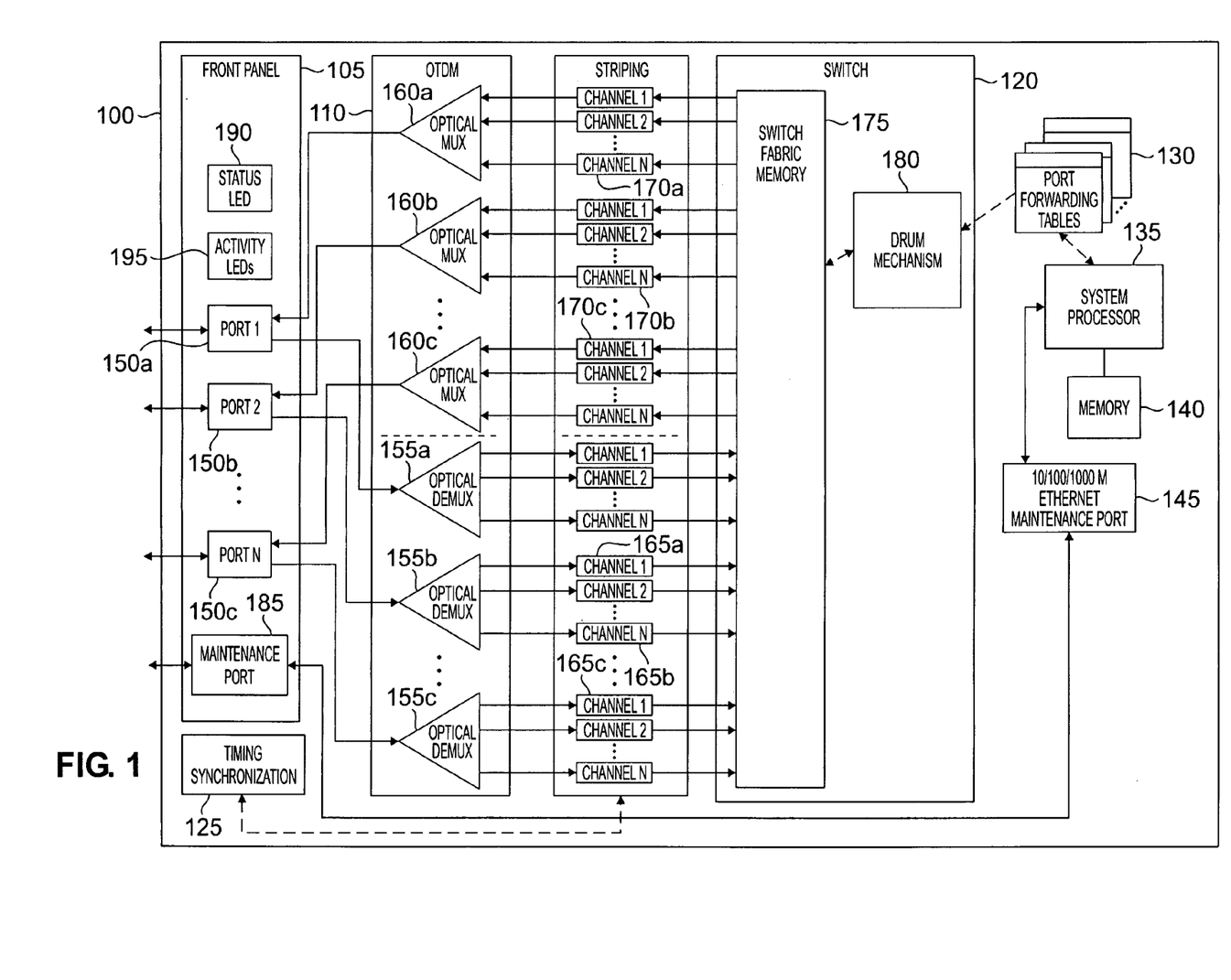
FIG. 1 illustrates an exemplary switching system that is capable of switching 100-Gigabit Ethernet frames according to the principles of the present invention.

FIG. 1 illustrates an exemplary switching system 100 that is capable of switching 100-Gigabit Ethernet frames, in addition to other high data rate frames, according to the principles of the present invention. Switching system 100 comprises a full duplex, point-to-point 100 Gbps Ethernet system that is operable to process a 120 Gbps serial data stream placed onto a fiber using a single wavelength. In order to create a processing window and to allow the use of lower speed, such as 10 Gbps, modulation techniques, the optical signal is separated into a plurality of electrical channels through a striping technique.

Switching system 100 comprises a front panel 105, an optical time division multiplexing (OTDM) module 110, a striping module 115, and a switch 120. Switching system 100 also comprises a timing synchronization module 125, port forwarding tables 130, a system processor 135, a memory 140, and a maintenance port application 145.

According to one embodiment, switching system 100 is implemented using a star concept with between 4 and 8 point-to-point, high data rate Ethernet ports 150 in the front panel 105. If more than eight ports 150 are implemented in switching system 100, a plurality of switches 120 may be cascaded to process the additional ports 150. An incoming, high data rate, serial data stream is separated into a specified number of lower data rate channels using a striping process to create a processing window that allows electronic processing, forwarding decisions, and switching at the lower data rate.

For a particular embodiment, the high data rate comprises approximately 100 Gbps, the lower data rate comprises approximately 10 Gbps, and the specified number of channels comprises twelve. However, it will be understood that other suitable values may be used for the high data rate, the lower data rate, and the specified number of channels without departing from the scope of the present invention. In addition, switching system 100 may be implemented for a system other than an Ethernet system without departing from the scope of the present invention.

Using twelve channels with 10 Gbps for each channel results in a total of 120 Gbps of throughput, with the extra 20 Gbps available to support the overhead used by the striping process. Thus, switching system 100 provides for a data rate of 120 Gbps in order to provide switching for incoming data streams comprising 100 Gbps of data.

OTDM module 110 comprises an optical demultiplexer 155 for each port 150 and an optical multiplexer 160 for each port 150. Striping module 115 comprises a set of channelized port receivers 165 for each optical demultiplexer 155 and a set of channelized port transmitters 170 for each optical multiplexer 160. The number of sets of channelized port receivers 165 and transmitters 170 corresponds to the number of stripes for switching system 100. Switch 120 comprises switch fabric memory 175 and a drum mechanism 180.

In operation, according to a particular embodiment, an incoming data stream received at an incoming port 150 is sent to an optical demultiplexer 155 in OTDM module 110, where the stream is separated into twelve stripes, or channels, and provided to the set of channelized port receivers 165 in striping module 115 that corresponds to the optical demultiplexer 155. The stripes are sent from the set of channelized port receivers 165 to switch fabric memory 175 in switch 120, where drum mechanism 180 switches the stripes to the appropriate output port 150.

Thus, switch 120 is memory-based using drum mechanism 180 with one position for each port 150 to provide switching. Each port 150 has its own forwarding table 130, which helps to keep the forwarding tables small and keeps access times predictable by avoiding memory contention among the port processes. Frames are demultiplexed, striped, and placed into switch fabric memory 175 by the channelized port receivers 165.

As described in more detail below in connection with FIGS. 4 and 5, drum 180 rotates at the stripe rate (e.g., 12.8 ns) and at each turn of drum 180 a maximum of one data block can be read from an inbound port and a maximum of one data block can be written to an outbound port. After switching provided by drum mechanism 180, the stripes are then sent from switch fabric memory 175 to the set of channelized port transmitters 170 associated with the outbound port written to by drum 180, where the stripes are provided to the optical multiplexer 160 corresponding to the output port 150. The optical multiplexer 160 multiplexes the twelve stripes into a single, 120 Gbps serial output data stream as an optical signal on a single fiber. OTDM module 110 then provides this optical signal to the output port 150, which sends the optical signal out.

In this way, striping opens up a window for processing, during which switch 120 is able to determine the output port 150 for the frame using lower data rate processing techniques. OTDM module 110 is operable to multiplex the striped data into a single serial data stream on a single wavelength at the output. To support the multiplexing/demultiplexing processes, timing of each channel is synchronized with the incoming data stream. Timing synchronization module 125 is operable to ensure accurate timing of each channel in order to support this multiplexing process.

System processor 135 and memory 140 are operable to provide management functions for switching system 100. Maintenance port application 145 is operable to provide maintenance functions through the use of a maintenance port 185 in front panel 105. In addition, front panel 105 may comprise a status LED 190 and activity LEDs 195, and/or other similar indicators, to provide information concerning the operation of switching system 100.

Figure 2:
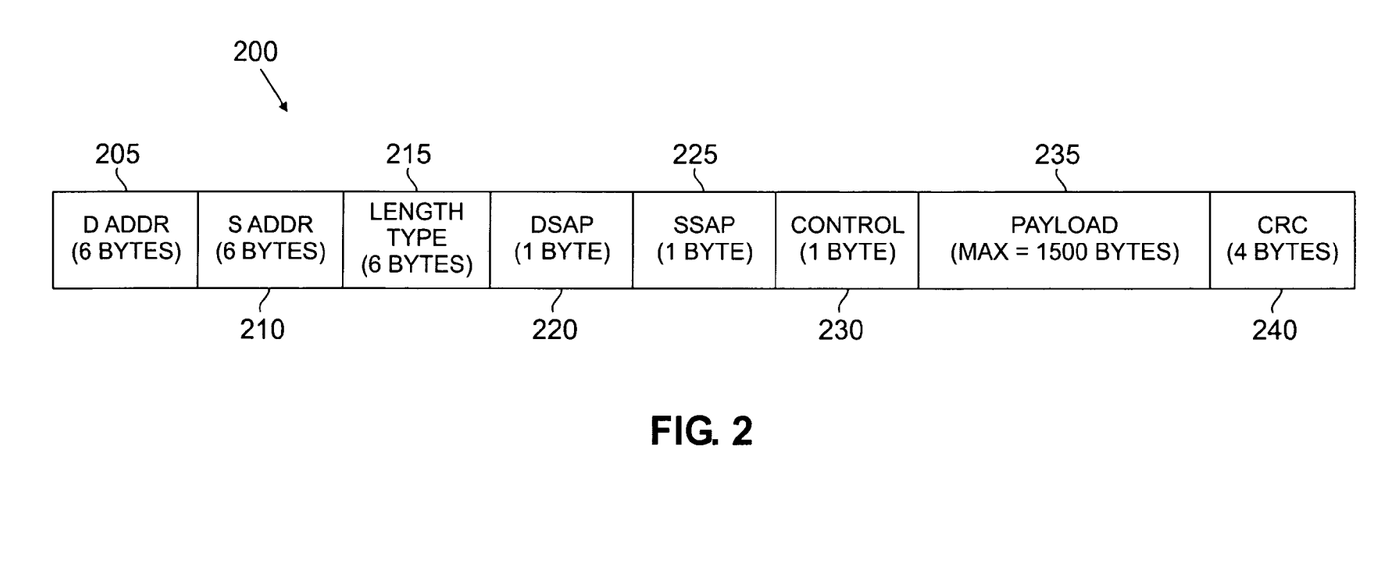
FIG. 2 illustrates a frame format for a 100-Gigabit Ethernet frame that may be switched by the switching system of FIG. 1 according to the principles of the present invention.

FIG. 2 illustrates a frame format 200 for a 100-Gigabit Ethernet frame that may be switched by switching system 100 according to the principles of the present invention. Frame format 200 comprises eight fields. Destination address (D Addr) field 205 comprises six bytes and provides a physical destination address that specifies to which adapter the data frame is being sent. Source address (S Addr) field 210 comprises six bytes and provides a physical source address that specifies from which adapter the message originated.

Length/Type field 215 comprises two bytes which generally specifies the length of the data in the frame. Destination service access point (DSAP) 220 comprises one byte and provides a logical destination address that acts as a pointer to a memory buffer in the receiving station. Source service access point (SSAP) 225 comprises one byte and provides a logical source address that acts as a pointer to a memory buffer in the originating station. Control field 230 comprises one byte and indicates the type of frame.

Payload field 235 comprises a maximum of 1500 bytes and provides the actual payload data for the frame. Payload field 235 may be padded to ensure that the entire frame format 200 comprises a multiple of 192 bytes. Thus, if data needs to be added to reach a multiple of 192 bytes, "don't care" data may be appended to the payload data in payload field 235 to reach the correct number of bytes. Cyclical redundancy check (CRC) field 240 comprises four bytes and provides error checking data for the frame.

Figure 3:
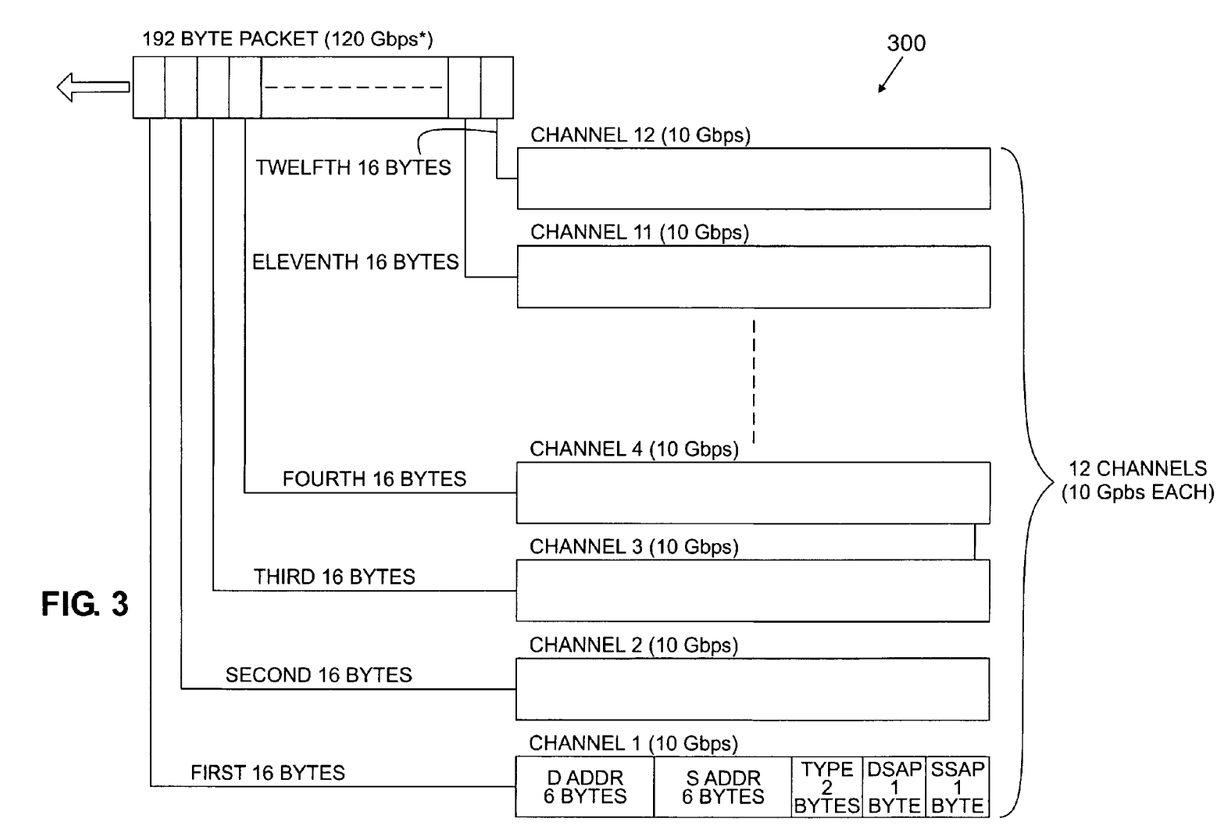
FIG. 3 illustrates a data striping technique for processing frames in the switching system of FIG. 1 according to the principles of the present invention.

FIG. 3 illustrates a data striping technique 300 for processing frames in switching system 100 according to the principles of the present invention. The data striping technique 300 illustrated in FIG. 3 involves a 100 GbE system that provides twelve channels, each of which are processed using 10 Gbps processing techniques. However, it will be understood that the data striping technique 300 may be configured to process any suitable high data rate system by striping the high data rate data stream into any suitable number of lower data rate data streams without departing from the scope of the present invention.

For the illustrated embodiment, blocks of 192 bytes each are striped into twelve channels of 16-byte stripes. Frames are filled to be a multiple of 192 bytes. Thus, as described in more detail above in connection with FIG. 2, "don't care" data may be added to each frame to reach a multiple of 192 bytes.

The data striping technique 300 provides for separating the 120 Gbps channel into twelve stripes of 10 Gbps each. Performing this striping creates a timing umbrella, or processing window, during which the packets may be processed and also allows 10 Gbps modulation techniques to be used.

For the illustrated embodiment, the first 16 bytes of each packet are sent to the first channel, the second 16 bytes are sent to the second channel, and so on. If there are more than 192 bytes of data for a particular frame, then additional sets of twelve channels are used. The length field 215 in the packet header may be used to determine how many sets of stripes are included in a frame.

Twelve, instead of ten, channels of 10 Gbps are used to absorb the overhead, such as padding, introduced by the stripe processing. In addition, parallel optics typically support twelve channels. If a typical traffic mix of 50% minimum 64 byte packets, 25% of midsize 500 byte packets, and 25% of large 1500 byte packets is assumed, this gives an average packet size of:

$$0.5(64 \text{ bytes}) + 0.25(500 \text{ bytes}) + 0.25(1500 \text{ bytes}) = 532 \text{ bytes}$$

and a bandwidth distribution of:
64 bytes packets: $0.5*(64/532) \cong 6\%$
500 byte packets: $0.25*(500/532) \cong 23.5\%$
1500 byte packets: $0.25*(1500/532) \cong 70.5\%$ The padding overhead for this traffic mix is:

$$\begin{aligned} \text{Overhead} &= 0.06 * \text{Ceiling}(64/192) * 192/64 + 0.235 * \\ &\quad \text{Ceiling}(500/192) * 192/500 + 0.705 * \\ &\quad \text{Ceiling}(1500/192) * 192/1500 \\ &= 0.06 * 3 + 0.235 * 1.152 + 0.705 * 1.024 \\ &\quad 1.17. \end{aligned}$$

Therefore, the channelized bandwidth that would be needed for this particular traffic mix would be 100 Gbps*1.17=117 Gbps. Thus, 120 Gbps of channelized bandwidth is sufficient to handle the padding overhead for typical traffic mixes.

If a packet had to be processed and switched between the last bit of the destination address 205 and the next bit of the packet, then there would be only 10 ps (a single bit time) in which to process and switch the packet. Data striping technique 300 creates a processing window for processing and switching because the processing and switching do not need to be completed until the last bit of the set of stripes is handled. Since there are a minimum of 192 bytes in the set of stripes and since the destination address 205 is provided in the first six bytes of the first stripe, as described above in connection with FIG. 2, there is a processing window of (192 bytes−6 bytes)*8 bits/(120*10$^9$ bits/s)≅12.4 ns to process the packet after the destination address 205 is received for the example embodiment. Thus, pipelining is built into the stripe structure.

As previously mentioned, another reason for using data striping technique 300 is to be able to use 10 Gbps direct modulation to process 100 Gbps data streams. Twelve parallel sets of 10 Gbps modulators are used for the illustrated embodiment.

Figure 4:
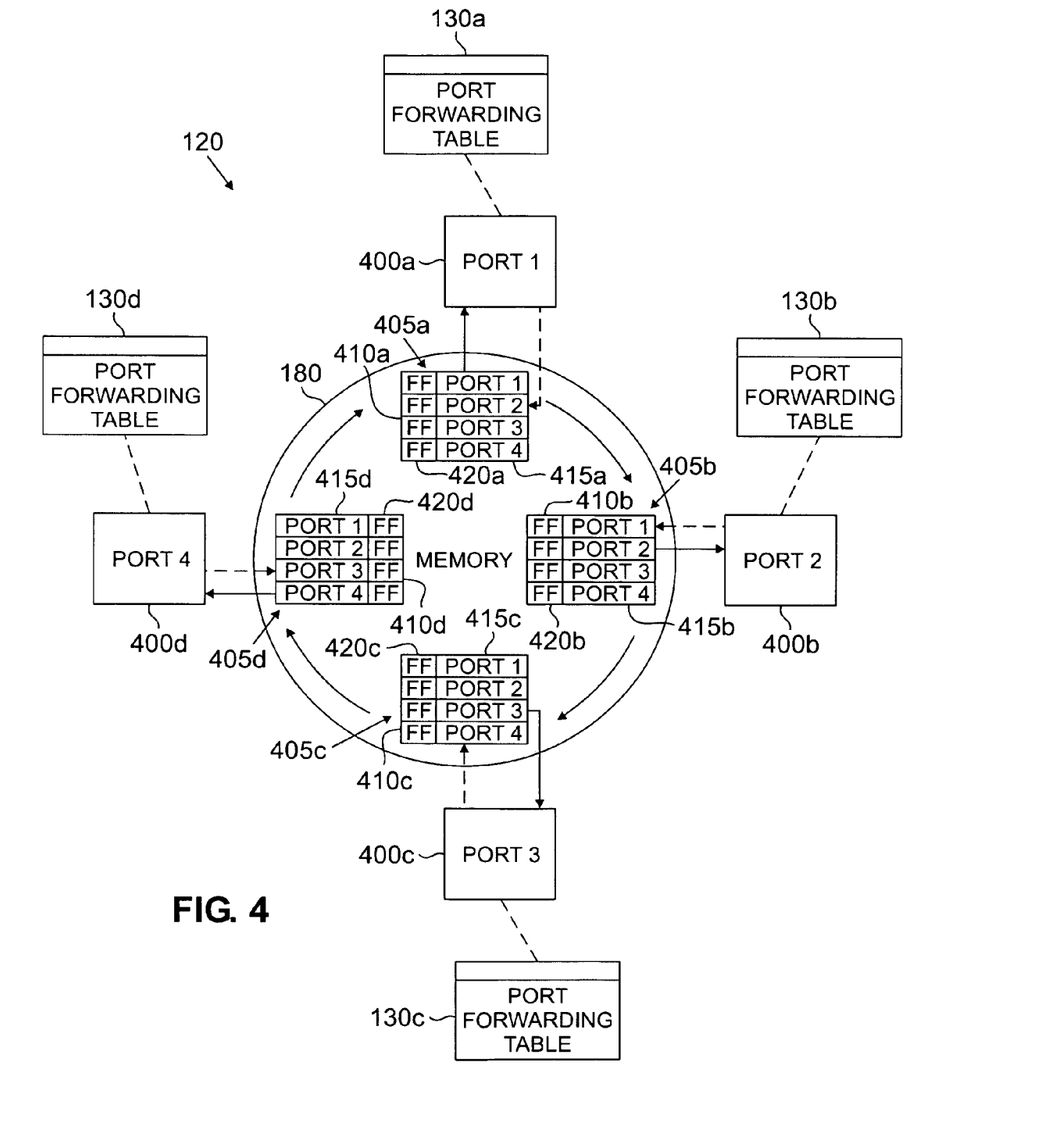
FIG. 4 illustrates the switch of FIG. 1 according to the principles of the present invention.

FIG. 4 illustrates switch 120 according to the principles of the present invention. Switch fabric memory 175 comprises a plurality of internal "ports" 400, each of which is operable to store a set of stripes that has been received from or that is to be transmitted to an external port 150. Drum 180 comprises one drum location, or spoke 405, for each port 400. For the illustrated and described embodiment, drum 180 comprises four spokes 405. However, it will be understood that drum 180 may comprise any suitable number of spokes 405 to correspond to the number of ports 400, which in turn corresponds to the number of ports 150 in switching system 100, without departing from the scope of the present invention. Each internal port 400 has its own forwarding table 130, which helps to keep the forwarding tables 130 small and keeps access times predictable by avoiding memory contention among the port processes.

Drum 180 rotates at the stripe rate. Thus, for the example embodiment in which switching system 100 is operable to process 192-byte frames at 120 Gbps, drum 180 makes a turn approximately every (192 bytes*8 bits/byte)/120 Gbps=12.8 ns. At each rotational position of drum 180, a set of stripes may be placed into a spoke 405 and transmitted from a spoke 405 by each port 400. A full rotation of drum 180 is a number of turns equal to the number of spokes 405 and, therefore, the number of ports 400.

The destination address 205 which determines the external output port 150, e.g., port 150b, is in the first six bytes of the first stripe of the first stripe set. For this example, the internal outbound port 400 may comprise port 400b. The internal inbound port, e.g., port 400a, that corresponds to the external incoming port 150, e.g., port 150a, does a lookup in forwarding table 130a for the first stripe set of each frame received on its external port 150a and sends the rest of the stripe sets for the frame to the same outbound port 400b.

The outbound port 400b does not need to do forwarding table lookup on frames received from drum 180. The internal outbound port 400b knows that the data is to be transmitted out its corresponding external output port 150b because the data has been placed in a port descriptor for the outbound port 400b on drum 180. Thus, the inbound port 400a determines the forwarding and uses virtual output queuing for switching frames.

Each port 400 has its own forwarding table 130 in local memory, thus keeping forwarding table size small and avoiding memory contention among the ports 400 during forwarding table lookups. The forwarding table 130 is searched using the destination address 205 in the frame header and a number for the outbound port 400 is returned. Since forwarding table lookup happens in an average of ~12.8 ns per lookup for the example embodiment, the memory of these tables 130 comprises an access time requirement that allows lookups to be accomplished within this amount of time. In order to keep lookups relatively quick, the process of performing a lookup in forwarding tables 130 may comprise a simple table lookup without using tree searching and with nesting of search tables kept to a minimum.

The number of stripe sets that may be buffered by ports 400 is the number of ports 400 squared because each port 400 comprises memory to store a stripe set for each of the ports 400, including itself. This memory is accessible to all ports 400 at essentially all times, so this memory comprises a shared memory. Each port 400 is able to write a stripe set at a time into its own queue. However, each port 400 is also able to read a stripe set from any of the other queues. For example, port 400a is able to read the queue of port 400c when port 400c indicates through drum 180 that a stripe set for port 400a is available in the queue for port 400c. Since stripe sets are written to these queues and read from these queues by each port 400 on each rotation, the memory of ports 400 comprises a relatively fast memory.

Drum 180 comprises a drum table 410 for each spoke 405. Each drum table 410 comprises a stripe set descriptor for each port 400. Each stripe set descriptor comprises a circular queue pointer 415 and a full flag 420. To avoid memory copies, queue pointer 415 may comprise a value placed into drum 180 that points to the first stripe of the stripe set queue in the inbound port 400. There is a fixed relationship between the pointer to the first (channel 1) stripe and the stripes of the other eleven channels, so a single pointer is sufficient.

Drum tables 410 rotate relative to ports 400, so at each rotation of drum 180, the next drum table 410 is available to each port 400. Drum table 410 comprises memory that may be shared memory or switched memory. Use of switched memory is possible because each port 400 has to access only one drum table 410 per rotational position and a drum table 410 is accessed by only one port 400 per rotational position. If drum tables 410 comprise shared memory, a pointer to the top of each drum table 410 may be stepped to the next position on each rotation of drum 180. If drum tables 410 comprise switched memory, however, a fixed pointer to the start of drum table 410 may be used and chip selects to the ports 400 may be rotated. Use of switched memory avoids memory contention among ports 400 in accessing drum tables 410 and also saves the increment operation to step to the next drum location on each turn of drum 180.

Due to the 12.8 ns drum turn rate in the example embodiment, this memory comprises a relatively fast memory. However, since drum table 410 is accessed a maximum of once for each receive and transmit data block by a port 400 on each turn of drum 180, the memory of drum table 410 may be slower than the queue memory for ports 400. The speeds of the forwarding table memory and drum table memory comprise fairly similar access time requirements.

A full flag 420 in drum table 410 that has been set indicates that a stripe set is queued for the corresponding port 400. The inbound port 400 sets full flag 420 when writing a stripe set for a port 400 and clears that full flag 420 on the next full rotation of drum 180. By having control of full flag 420, the inbound port 400 is able to prevent interleaving of frames to a particular port 400. For example, if a port 400 is sending a frame that is multiple stripe sets long, the port 400 is able to keep control of full flag 420 for the full rotation, allowing the port 400 to send the rest of the frame without another port 400 starting to send a new frame in the middle of the one in progress.

At each drum position, i.e., for each turn of drum 180, each port 400 receives at most one stripe set and transmits at most one stripe set. At each turn of drum 180, each port 400 (i) clears any full flags 420 set by that port 400 a full rotation earlier; (ii) receives a stripe set, if available, from the corresponding external port 150 and does a forwarding table lookup to determine the outbound port 400 if it is the first stripe set in a frame; (iii) if there is a stripe set to send to another port 400, checks full flag 420 for that port 400 in its current drum table 410 and, if full flag 420 is clear, sets full flag 420 and writes queue pointer 415 for the port 400 in its current drum table 410; and (iv) processes an incoming stripe set and transmits it to its external port 150 if its own full flag 420 is set in drum table 410.

To achieve 12.8 ns stripe set processing throughput, multiple functions may be performed in parallel for some embodiments. Thus, for example, one stripe set may be received from the external port 150, while forwarding lookup is performed on the previous stripe set, and while a stripe set is being transmitted out the external port 150. A stripe set is not overwritten until there are a number of turns of drum 180 equal to the number of ports 400, since the inbound port 400 holds the full flag 420 for a full rotation of drum 180. This facilitates operations on previous stripe sets to support concurrent processing through up to N−1 turns of the drum, where N is the number of ports 400.

One example of this type of concurrent processing provides for each port 400 to be able to perform up to three concurrent processes. First, each port 400 is able to output data from drum 180 to an external port 150. Second, each port 400 is able to read data from an external port 150. Third, each port 400 is able to perform a forwarding table lookup on data read from another port 400 and send it to the outbound port 400 via drum 180. For another embodiment, the second and third processes may be combined into a single process. Data striping technique 300 opens up a processing window that enables combining these functions.

For each of these embodiments, queue pointer 415 may comprise three separate pointers: (i) a write pointer used to point to the next location to use for data read from the port 400, (ii) a read pointer used to point to the next location to use for output to drum 180, and (iii) a clear pointer used to free locations written to drum 180 after one full rotation.

Figure 5:
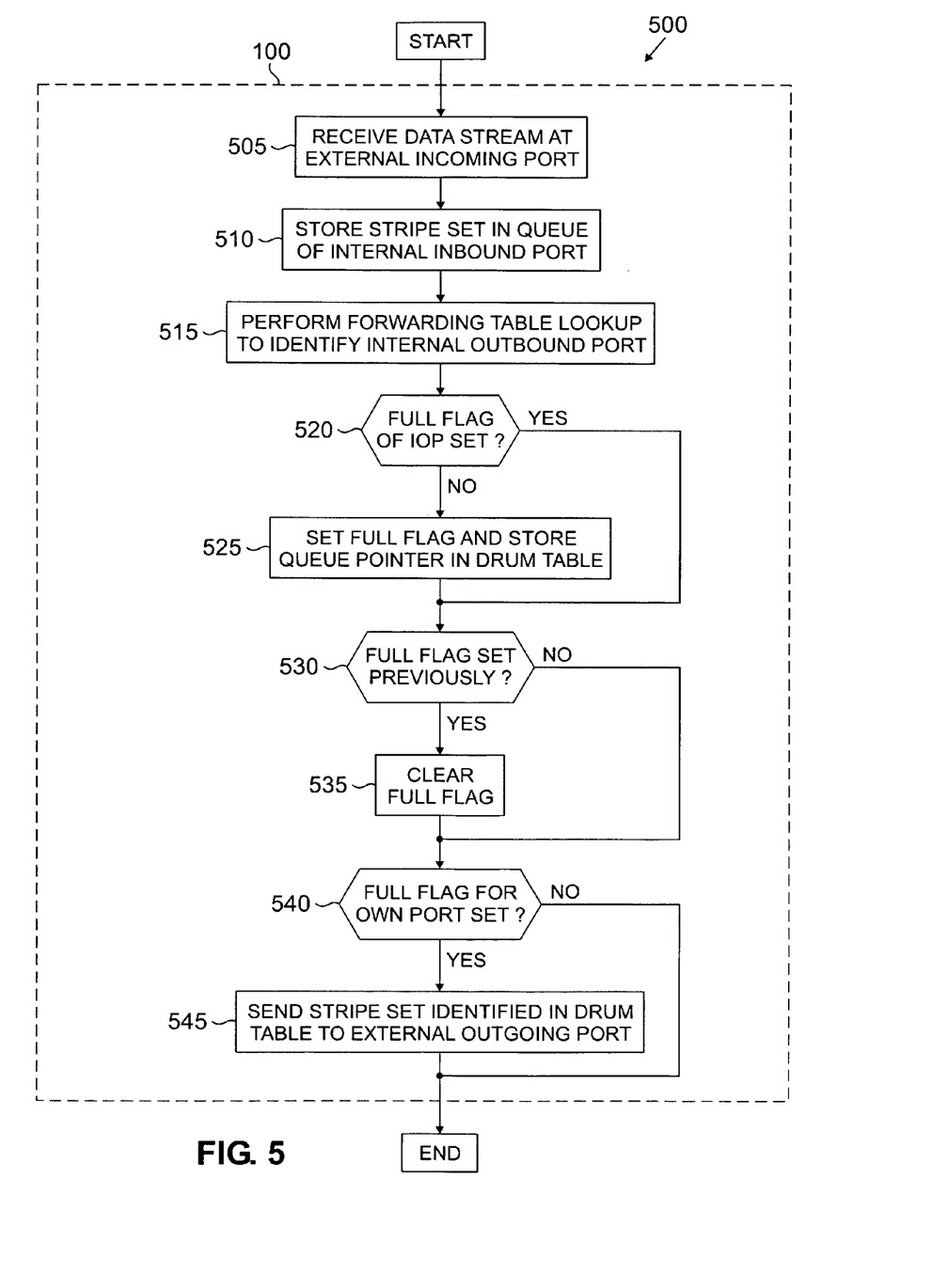
FIG. 5 is a flow diagram illustrating a method for switching frames using the switching system of FIG. 1 according to the principles of the present invention.

FIG. 5 is a flow diagram illustrating a method 500 for switching frames using switching system 100 according to the principles of the present invention. The method 500 describes the actions that each port 400 may take after each rotation of drum 180 such that the port 400 has access to one of drum tables 410.

Initially, a data stream is received at an external incoming port 150, such as port 150a (process step 505). After data striping is performed on the data stream, the stripe set is stored in a queue of an internal inbound port 400, such as port 400a, corresponding to the external incoming port 150a (process step 510). When the first stripe set of a frame is received, the inbound port 400a performs a lookup in forwarding table 130a to identify an internal outbound port 400, such as port 400b, for the stripe set (process step 515).

The inbound port 400a then checks the full flag 420 for the internal outbound port (IOP) 400b to determine whether or not the full flag 420 is set, indicating that another port, such as port 400c or 400d, is currently sending a stripe set to port 400b. If the full flag 420 is not set (process step 520), the inbound port 400a sets the full flag 420 for the outbound port 400b and stores a queue pointer 415 in drum table 410 to identify the location of the stripe set previously stored by the inbound port 400a (process step 525).

The port 400a also determines whether or not that port 400a set a full flag 420 for another port 400, such as port 400c or 400d, a full rotation of drum 180 previously. If a full flag 420 was set by port 400a a full rotation earlier (process step 530), port 400a clears that full flag 420 (process step 535).

Finally, port 400a determines whether or not the full flag 420 corresponding to itself has been set. If the full flag 420 for the port 400a is set (process step 540), the port 400a, acting as an outbound port, sends the stripe set identified in the stripe set descriptor in drum table 410 to its corresponding external port 150a, which then acts as an outgoing port for the data contained in the stripe set that has been recombined into a single data stream (process step 545).

Although the present invention has been described with an exemplary embodiment, various changes and modifications may be suggested to one skilled in the art. It is intended that the present invention encompass such changes and modifications as fall within the scope of the appended claims.

What is claimed is:

1. A method for switching frames in a switching system, comprising:
   receiving a first stripe set for a first port at a second port;
   storing the first stripe set in a particular location in a queue of the second port;
   determining whether a first full flag associated with the first port has been set; and
   if the first full flag has not been set, setting the first full flag and providing the particular location in the queue of the second port to the first port.

2. The method as set forth in claim 1, further comprising:
   determining whether a second full flag associated with the second port has been set; and
   if the second full flag has been set, retrieving a queue pointer operable to identify a location of a second stripe set and retrieving the second stripe set based on the queue pointer.

3. The method as set forth in claim 2, further comprising sending the second stripe set to an external port corresponding to the second port.

4. The method as set forth in claim 1, further comprising:
   determining whether a second full flag associated with a third port has been set previously by the second port; and
   if the second full flag has been set previously by the second port, clearing the second full flag after a specified action is accomplished.

5. The method as set forth in claim 4, the specified action comprising a full rotation of a drum, the drum operable to be accessed by the second port and the third port and operable to store the second full flag.

6. The method as set forth in claim 1, the first stripe set comprising a plurality of lower data rate (LDR) stripes having a low data rate, the LDR stripes generated by a data striping technique performed on an incoming high data rate (HDR) data stream having a higher data rate than the low data rate, each of the plurality of LDR stripes processed using processing techniques associated with the low data rate.

7. The method as set forth in claim 6, the higher data rate comprising 100 Gbps, the low data rate comprising 10 Gbps, and the plurality of LDR stripes comprising twelve LDR stripes.

8. A method for switching frames in a switching system, comprising:
   determining whether a first full flag associated with a first port has been set; and
   if the first full flag has been set, retrieving a queue pointer operable to identify a location of a first stripe set and retrieving the first stripe set based on the queue pointer.

9. The method as set forth in claim 8, further comprising sending the first stripe set to an external port corresponding to the first port.

10. The method as set forth in claim 8, further comprising:
    determining whether a second full flag associated with a second port has been set previously by the first port; and
    if the second full flag has been set previously by the first port, clearing the second full flag after a specified action is accomplished.

11. The method as set forth in claim 10, the specified action comprising a full rotation of a drum, the drum operable to be accessed by the first port and the second port and operable to store the second full flag.

12. The method as set forth in claim 8, the first stripe set comprising a plurality of lower data rate (LDR) stripes having a low data rate, the LDR stripes generated by a data striping technique performed on an incoming high data rate (HDR) data stream having a higher data rate than the low data rate, each of the plurality of LDR stripes processed using processing techniques associated with the low data rate.

13. The method as set forth in claim 12, the higher data rate comprising 100 Gbps, the low data rate comprising 10 Gbps, and the plurality of LDR stripes comprising twelve LDR stripes.

14. A switching system for switching frames, comprising:
a plurality of ports, each port operable to store a stripe set for each of the plurality of ports;
a drum coupled to the ports, the drum comprising a plurality of drum tables and operable to rotate such that each port is operable to access a different one of the drum tables with each rotation, a full rotation of the drum allowing each port to access each one of the drum tables, each drum table comprising a queue pointer and a full flag for each port; and
each port further operable to read stripe sets stored by the other ports based on the queue pointers and the full flags in the drum tables.

15. The switching system as set forth in claim 14, each port further operable, after each rotation of the drum, to receive a first stripe set for a first port, to store the first stripe set in a particular location, to determine whether a first full flag associated with the first port has been set and, if the first full flag has not been set, to set the first full flag and provide the particular location to the first port.

16. The switching system as set forth in claim 14, each port further operable, after each rotation of the drum, to determine whether a first full flag associated with the port has been set and, if the first full flag has been set, to retrieve a queue pointer operable to identify a location of a first stripe set and retrieve the first stripe set based on the queue pointer.

17. The switching system as set forth in claim 16, each port further operable to send the first stripe set to an external port corresponding to the port.

18. The switching system as set forth in claim 14, each port further operable, after each rotation of the drum, to determine whether a first full flag associated with a first port has been set previously by the port and, if the first full flag has been set previously by the port, to clear the first full flag after a specified action is accomplished.

19. The switching system as set forth in claim 18, the specified action comprising a full rotation of the drum.

20. The switching system as set forth in claim 14, each stripe set comprising twelve lower data rate (LDR) stripes having a data rate of 10 Gbps, the LDR stripes generated by a data striping technique performed on an incoming high data rate (HDR) data stream having a data rate of 100 Gbps, each of the LDR stripes processed using processing techniques associated with the data rate of 10 Gbps.

\* \* \* \* \*